Dec. 30, 1969 E. L. MIDGETTE 3,486,741

IMPELLER

Filed Feb. 6, 1968 2 Sheets-Sheet 1

INVENTOR.
ERNST L. MIDGETTE
BY Charles Marks

Dec. 30, 1969 E. L. MIDGETTE 3,486,741

IMPELLER

Filed Feb. 6, 1968 2 Sheets-Sheet 2

INVENTOR.
ERNST L. MIDGETTE
BY Charles Marks

United States Patent Office 3,486,741

Patented Dec. 30, 1969

3,486,741

IMPELLER

Ernst L. Midgette, Brooklyn, N.Y., assignor of one-sixth each to Katherine S. Daniel and Thomas M. Daniel, both of Teaneck, N.J., and one-sixth to Marjorie E. van Name, Scotch Plains, N.J.

Filed Feb. 6, 1968, Ser. No. 703,311
Int. Cl. B01f 5/16, 7/26
U.S. Cl. 259—107 8 Claims

ABSTRACT OF THE DISCLOSURE

A rotary impeller for wetting and dispersing a powder in a liquid. The impeller includes a rotary disc urging the powder into currents which superficially wet dry lumps of the powder and break them up into smaller agglomerates. The smaller agglomerates are then carried through annular venturis where a viscous shear stress is encountered, thereby separating and dispersing the agglomerates.

BACKGROUND OF THE INVENTION

Field of the invention

This invention relates to a rotary impeller for wetting and dispersing powdered pigments and other particulate matter in a liquid medium.

Description of the prior art

Rotary impellers have been used for a long time to wet pigment powders and to blend pigment pastes. More recently, with the introduction of fine particle size pigments, these rotary impellers have also been used to disperse pigments as well as to wet them. In other words, the rotary impellers have been used to wet the pigment particles first and subsequently to break up loose clusters or so-called agglomerates of pigment particles. The extent to which rotary impellers succeed in breaking up the pigment clusters, i.e., to disperse the pigment in the liquid, depends on several factors, among them the viscosity of the liquid, the rotary speed, the size and cohesiveness of the agglomerates, and the design of the rotary impeller. It will be understood that the dispersion of the pigment takes place only after the pigment agglomerates have been wetted, that is, immersed in the liquid medium. Therefore, prior art impellers have often been designed with the particular view of making the first step of the process, namely, the pigment wetting, as efficient as possible. However, although the best way to achieve wetting is by turbulent flow, it is not the most suitable way of effecting dispersion. Laminar flow is a far more effective means of dispersion, but it is not a very effective means of pigment wetting.

Despite these considerations, conventional impellers fail to utilize laminar flow in an effective manner for dispersing particulate clusters or agglomerates and also fail to perform effectively the dual functions of wetting and dispersion of such clusters or agglomerates.

SUMMARY OF THE INVENTION

The present invention solves these problems by means of a bi-functional rotating impeller which is disposed in the liquid medium. The impeller incorporates a disc which directs dry lumps of particulate matter into a region of turbulent flow where the lumps are broken up into smaller particulate clusters or agglomerates and exposed to a superficial wetting action while the impeller also directs such clusters or agglomerates to a column of one or more profiled rings supported co-axially with the disc and disposed at spaced intervals so as to define annular venturis in which a rapid converging and diverging laminar flow occurs. This flow subjects the clusters or agglomerates to a viscous shear stress which effectively separates and disperses the particles composing the clusters or agglomerates.

Thus, the primary object of the invention is to provide an improved rotary impeller which accomplishes wetting and dispersion of particulate matter in a manner whereby it is subjected to an efficient wetting action by turbulent flow and an efficient deagglomeration and dispersion by laminar flow in a liquid medium disposed in a container.

Another object of the present invention is to provide an improved impeller for use as a part of the equipment employed in rotary impeller machines intended to effect uniform dispersion of finely divided solid particles in a liquid medium or vehicle.

Another object of the invention is to provide an impeller of the kind last-described, which can fulfill its functions in a minimum of time and with a minimum of energy and manpower, over a wide range of solids-vehicle combinations.

Another object of the invention is to provide such an impeller which can be used for the wetting, deagglomeration and dispersion of pigment powders.

A further object of the invention is to provide an impeller that will accomplish a rapid wetting of particulate matter introduced to the liquid vehicle and will achieve that function with a minimum of absorbed energy and elapsed time, while also minimizing the likelihood of clogging the impeller members wherein deagglomeration and dispersion of the particulate matter occurs.

A further object of the invention is to provide an impeller of the kind last described which accomplishes complete, overall circulation of the liquid vehicle in its container, which circulation avoids the creation of so-called "dead spots."

A further object of the invention is to provide an impeller that will automatically develop a maximum shear-producing pressure for any given peripheral speed of impeller rotation, while concurrently providing an effective circulation of the liquid vehicle through the region wherein said pressure is developed, thereby effecting an efficient means for deagglomerating and dispersing particulate clusters contained in the liquid vehicle.

A further object of the invention is to provide a rotary impeller which will utilize laminar fluid flow through a venturi member to accomplish deagglomeration and dispersion of particulate clusters carried in the fluid.

A still further object of the invention is to provide an impeller of the character described which is disposable in various positions in the liquid medium.

Other and further objects and advantages of the present invention will become apparent from the following discussion as read in conjunction with the accompanying drawings.

DESCRIPTION OF THE PREFERRED EMBODIMENT

Figure 1:
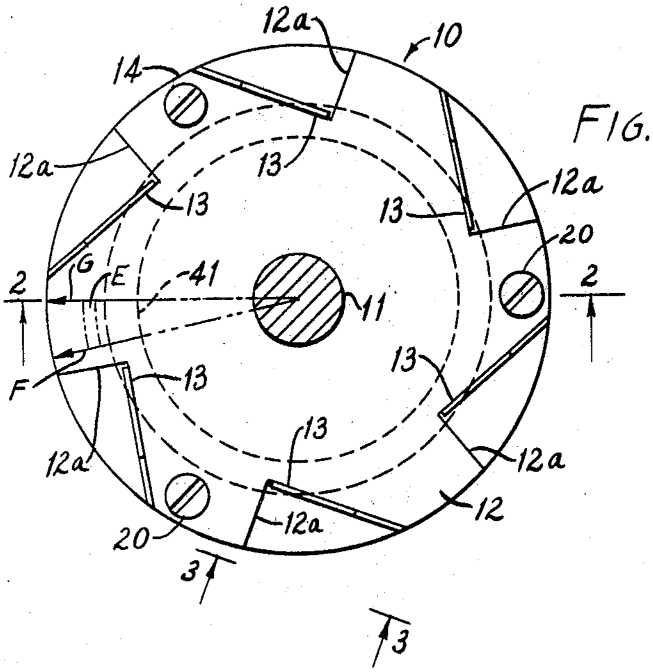
FIG. 1 is a plan view of one form of the present invention.

The present invention contemplates that the impeller be supported by a spindle and initially disposed in a generally central position within the container of the liquid medium intended for reception of powder or particulate matter. In this position, the impeller is rotated so as to cause the liquid medium to circulate around the impeller and form a cup-shaped opening in the liquid in the vicinity of the spindle and upper portion of the impeller.

The powder or particulate matter, in its customary dry form, includes lumps of such matter which are of various sizes. In using the present invention, the powder containing these lumps is introduced to the aforesaid cup-shaped opening where they will tend to be broken up upon contact with the upper portion of the impeller, the liquid medium defining the cup-shaped opening, and particularly, turbulent fluid flow in said liquid medium into which the lumps are directed by the impeller and the streaming fluid surrounding the cup-shaped opening.

After the desired quantity of said powder is introduced to the liquid medium in the aforesaid manner, the impeller is moved laterally of its first-mentioned central position in the container of the liquid medium and the vertical disposition of the impeller is adjusted, as desired, so as to eliminate the said cup-shaped opening in the liquid medium. With this arrangement, however, the fluid flow around the impeller continues to include a substantial degree of turbulence.

The turbulent flow initially created upon the rotation of the impeller and continuing after its disposition laterally of the center of the container of the liquid, not only tends to break up the lumps of powder into smaller particulate clusters or agglomerates, as aforesaid, but also induces the escape of quantities of air associated therewith, thereby permitting the wetting of the clusters or agglomerates. However, despite this wetting action, which is primarily exercised upon the outer surfaces of the clusters or agglomerates and frequently does not penetrate to the unexposed surfaces of the particles within the clusters or agglomerates, the said particles tend to continue to cohere and be undispersed individually in the liquid medium. As will hereinafter be set forth, the dispersion of these clusters or agglomerates is accomplished by exposing them to differential velocities encountered in laminar fluid flow afforded by annular venturi means incorporated in the impeller.

The foregoing functions of the invention will be better understood from the following description of a preferred form of the invention. Thus, as shown in FIGS. 1 through 4 of the drawings, a preferred form of the invention includes an impeller, generally designated by the numeral 10 and depending from a vertical rotatable shaft or spindle 11. The impeller is provided with a generally circular disc 12 which includes an annularly spaced series of upright vanes 13 preferably formed integrally with said disc 12, as by slotting the disc 12 to form the edges **12*a* and bending adjacent portions of the disc 12 to an upright position, thereby forming the said vanes 13**.

Figure 3:
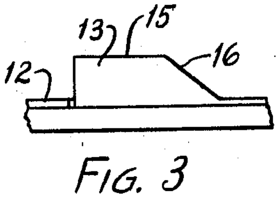
FIG. 3 is a fragmentary elevational view taken about the line 3—3 of FIG. 1 and depicting a vane employed in the said form of the invention.

As may be seen in FIG. 1, each of the vanes 13 extends inwardly and angularly, rather than radially, from the circumferential periphery 14 of the disc 12, the said vanes 13 having faces directed tangentially of a circle generated about the center of the disc 12. The upper portion of each of the vanes 13 includes a horizontal edge 15 and inclined edge 16, as depicted in FIG. 3.

Although the aforesaid conformation of the vanes 13 has been described as used in the preferred form of the invention depicted in the drawings, it is to be understood that vanes of other conformations and modes of attachment to the disc 12 or to the hereinafter mentioned carrier plate 18 may also be employed.

Figure 2:
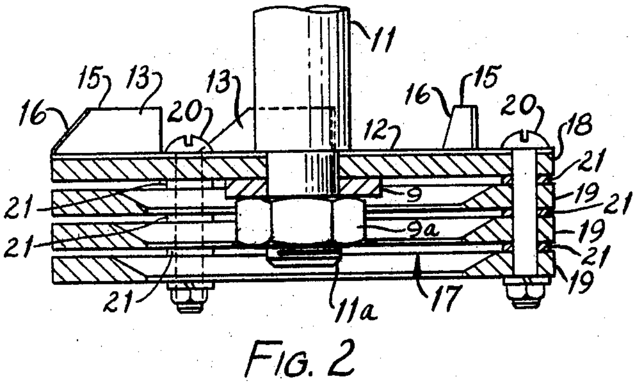
FIG. 2 is a cross-sectional view taken about the line 2—2 of FIG. 1.
Figure 4:
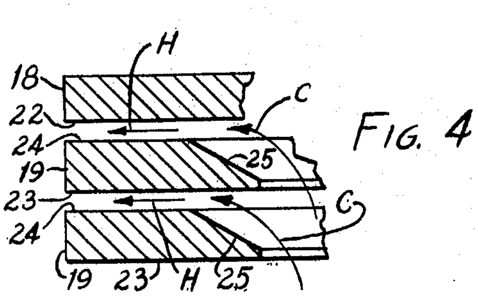
FIG. 4 is an enlarged, fragmentary cross-sectional view of several of the venturi members employed in the said form of the invention.

As may be best seen in FIG. 2, the disc 12 surmounts a circular carrier plate 18 and a column of annular rings 19 depending from the plate 18, said rings 19 being supported by a plurality of longitudinal elements such as the bolt, nut and washer assemblies generally designated by the numeral 20 and extending through the disc 12 and plate 18, which are also affixed to the spindle 11 by means of a washer 9 and nut **9*a* threadedly engaged with an extension 11*a* of the spindle 11. The plate 18 and rings 19 are disposed at spaced intervals with respect to each other by suitable spacers such as washers 21. An enlarged, fragmentary, cross-sectional view showing the spaced disposition of a typical plate 18 and rings 19** is depicted in FIG. 4.

An important feature of the present invention resides in the conformation of the spaced regions defined by the said plate 18 and rings 19. Thus, as may be seen in FIG. 4, the lower surface 22 of the plate 18 and the lower surface 23 of each of the rings 19 have a planar conformation which extends transversely and perpendicularly of their longitudinal axis that coincides with the axis of the vertical, rotatable shaft or spindle 11. The upper portion of each of the rings 19 includes a planar surface 24 extending parallel to the surfaces 22, 23 and also includes an inclined surface 25, extending from said planar surface 24 inwardly towards the aforesaid longitudinal axis. With this disposition and conformation of the plate 18 and rings 19, a plurality of annular venturis are created.

It is to be understood that the term, "venturi," as used herein, is intended to refer to a structure which is constricted at one section and defines a path of converging fluid flow on the upstream side and diverging fluid flow on the downstream side of said constricted section. As hereinafter indicated, various forms of the annular venturis incorporated in the present invention may accomplish paths of fluid flow of this kind.

Figure 6:
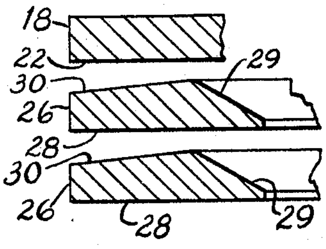
FIG. 6 is a view similar to that of FIG. 4 but showing a modified form of said venturi members.

Thus, it should be observed that the conformation of the annular venturis of the present invention may be changed, as desired, so as to suit various applications of the invention. For example, another conformation of the annular venturis, as employed in a modified form of the invention, is depicted in FIG. 6 where annular rings 26, generally similar to the previously described rings 19, are employed. The annular rings 26 have planar and inclined surfaces 28, 29 which are similar respectively to the previously described surfaces 23, 25 but unlike the upper portion of each of the rings 19, which includes the axially transverse and perpendicular planar surface 24, the upper portion of each of the annular rings 26 includes an outwardly inclined surface 30 which extends from the inclined surface 29 to the outermost circumferential periphery of the annular rings 26.

The operation of the present invention can be appreciated by reference to the aforesaid FIGS. 1 through 4, 6 and FIG. 5 wherein the invention is illustrated in operative position within a liquid medium 31 contained in a suitable container or vessel 32.

Figure 5:
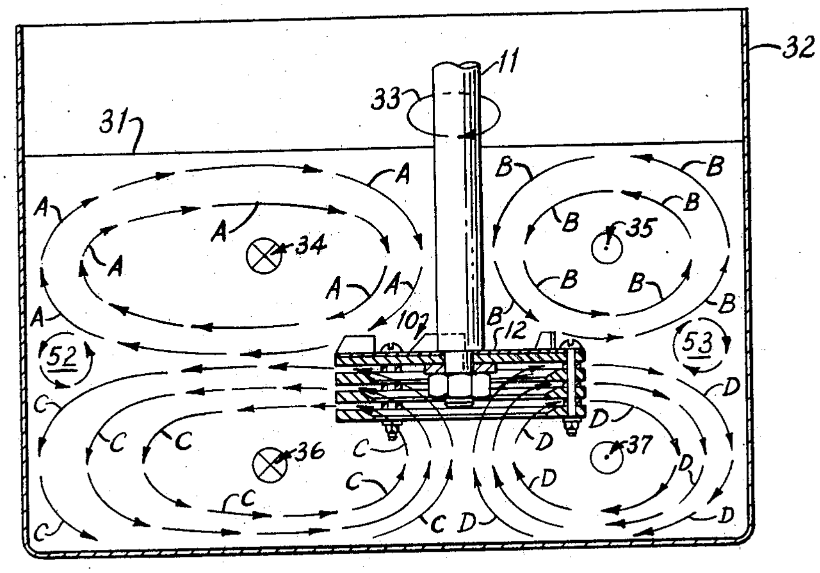
FIG. 5 is a cross-sectional elevational view, depicting the aforesaid form of the invention in operation.

It is to be understood that the position of the impeller 10 depicted in FIG. 5 corresponds with a disposition thereof lateral of the central axis of the container or vessel 32, such as may be assumed by the impeller 10 after the particulate matter has been introduced to the liquid medium 31 in the previously described manner and after the lumps in said particulate matter have been initially exposed to being broken up and wetted by the turbulent flow about the impeller 10. In the position shown in FIG. 5, the impeller continues to be rotated about its vertical axis, as in the direction indicated by the arrow 33, by the shaft 11 so as to maintain a rapid circulation of fluid around the shaft 11. This fluid circulation includes a generally toroidal flow pattern around the said rotating shaft 11, said pattern including currents such as in the directions indicated by the clockwise arrows "A," and counterclockwise arrows "B," centered respectively about the rearward and leading ends 34, 35 of the circular axis of said toroidal flow depicted in FIG. 5.

It is to be noted that when the powder was first introduced to the originally created cup-shaped opening in the liquid medium 31, said powder, including any lumps contained therein, was subjected to centrifugal force by the rotating disc 12 and liquid defining the cup-shaped opening, thereby urging the powder and lumps generally radially of the disc 12 and into the liquid medium 31. By reason of the action of the vanes 13, the currents, "A" and "B," induced in the position of the impeller depicted in FIG. 5, continue to urge any lumps in the powder to be broken up and wetted in preparation for the dispersion of the powder in the liquid medium 31, said toroidal flow also being turbulent.

In respect to the said centrifugal distribution of the powder, it will be observed that the annularly spaced intervals between the vanes 13 permit radial movement of said powder from the upper face of the disc 12 into the streaming liquid around the impeller 10 and thereby avoid any clogging or prevention of entry into the liquid medium 31 which might otherwise occur.

It will also be observed that in addition to the above-described toroidal flow pattern in the vicinity of the upper portion of the impeller, there are also regions of turbulence 52, 53 at the general level of the disc 12 and laterally thereof between the aforesaid toroidal flow pattern and a region of generally toroidal flow around the lower portion of the impeller 10. This region includes currents such as those in the general direction of the counterclockwise arrows "C," and clockwise arrows "D," centered respectively about the rearward and leading ends 36, 37 of the circular axis of flow depicted in FIG. 5, these currents "C," "D" representing circulation through and around the anular venturis as hereinafter described.

Particulate clusters or agglomerates which remain after the initially present lumps of particulate matter are broken up and which have been exposed to wetting in the upper portion of the liquid medium 31, are urged downwardly into the said lower region of generally toroidal flow by the action of the currents in the regions 52, 53 and by the centrifugal force exerted upon said clusters or agglomerates by the currents in the upper region of generally toroidal flow, such as the currents, "A," "B."

The clockwise and counterclockwise currents, such as those indicated by the arrows "C" and "D," bring the agglomerates into the inverted, generally cup-shaped region 17 of the column of rings 19, where said aggomerates are urged through the spaced regions between the plate 18 and rings 19.

An important feature of the present invention resides in the deagglomeration action which occurs in these spaced regions. This action may be best understood by reference to FIGS. 1 and 4 of the drawings. As may be seen in FIG. 4, the currents, such as those designated by the counterclockwise arrows "C," encounter the spaced regions defined by the plate 18 and the rings 19.

The conformation of these spaced regions is such that they constitute a series of annular venturis which subject agglomerates of the powdered particles in the currents, "C," to a viscous shear when flowing through said venturis. Thus, it will be observed that when said agglomerates enter the inverted, generally cup-shaped region 17, the movement of the agglomerates tends to approach the angular velocity of the impeller 10, thereby subjecting them to centrifugal force which urges the agglomerates, as well as the portion of the liquid medium 31 within the said region 17, to enter the spaced regions between the plate 18 and the rings 19.

By virtue of this centrifugal action, the said agglomerates and portion of the liquid medium 31 associated therewith are induced to undergo a rapid, laminar flow into the gradually restricted areas defined by each inclined surface 25 and the adjacent planar surfaces 22, 23 of the plate 18 and rings 19, the said laminar flow reaching its maximum velocity in the vicinity of the constricted section or throat of each said annular venturi, which throat is adjacent to the intersection of the inclined surface 25 and the transverse surface 24 of each said ring 19.

After reaching said throat, the path of flow of each element of volume of the liquid medium 31 expands while traversing the spaced regions between the parallel surfaces 22, 23, 24. This may be appreciated by referring to FIG. 1 where it will be observed that each element of volume "E" of fluid flowing radially of the impeller 10 will encounter expanding surface areas on the surfaces 22, 23, 24 between their external circumferential peripheries 40 and the line of intersection 41 intermediate of each surface 24 and inclined surface 25, and the radial arrows "F," "G."

Thus, the plate 18 and rings 19 define a series of annular venturis which induce a restricted and then, expanded fluid flow of the liquid medium 31 and agglomerates contained therein. This fluid flow is laminar in nature and the radial velocity thereof varies from zero at the surfaces of the venturis to a maximum in the region intermediate of said surfaces and equidistant therefrom, as, for example, along the paths of the arrows "H" in FIG. 4.

The variations in fluid velocity in such laminar flow induce a viscous shear stress upon agglomerates of powdered particles contained therein, thereby urging said particles to deagglomerate.

As to any particulate clusters which may have emerged from the venturis without being deagglomerated thereby, they will tend to be returned to the cup-shaped region 17 by currents such as those in the direction of the counterclockwise arrows "C," where such clusters will again be induced to enter the venturis and urged to deagglomerate in the previously described manner.

It is noteworthy that by suitable variation of the height of the spaced region between the surfaces of each venturi, the diameter of the impeller 10 and its speed of rotation, it is possible to effect a wide range of viscous shear stress in the venturis. The vertical axis of the impeller 10 may also be disposed in a variety of locations with respect to the central axis of the vessel 32, as desired.

By varying the conformation of the annular venturis, as in the modified form of the invention depicted in FIG. 6, where the surfaces 29 are similar to the surfaces 25 in FIG. 4 but the surfaces 30 are radially downwardly inclined, it is also possible to effect a corresponding variation in the laminar fluid flow through said venturis.

Figure 7:
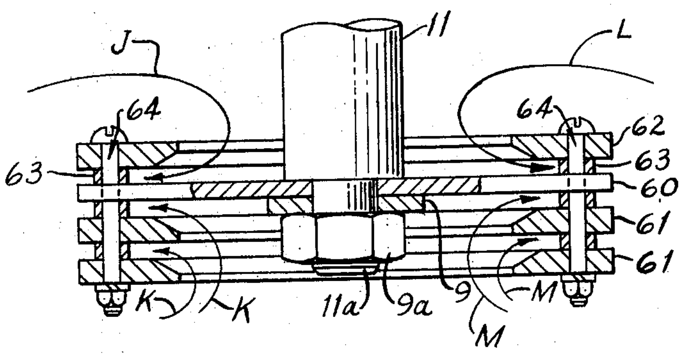
FIG. 7 is a cross-sectional, elevational view depicting a modified form of the invention.

Although the aforesaid forms of the invention have contemplated an arrangement whereby one or more annular rings are located beneath the plate 18, it will be observed that a different arrangement, such as that depicted in FIG. 7, is possible. In this form of the invention, no vanes are employed. Instead, a circular carrier plate 60 is disposed intermediately of annular rings 61, 62, the plate 60 being affixed to a rotatable spindle 11 by means of a washer 9 and nut 9*a* threadedly engaged with an extension 11*a* of said spindle 11.

Each of the annular rings 61, 62 has a conformation similar to that of each of the previously described annular rings 19 but although the rings 61 are disposed in spaced relation with respect to each other and the plate 60 in the same manner as that described in reference to the rings 19 and plate 18, the annular ring 62 is in an inverted position, as shown in FIG. 7, and is maintained in spaced relation with respect to the plate 60 by means of suitable washers 63. As in the case of the first-described form of the invention, the plate 60 and rings 61, 62 are maintained in a column by means of bolt, nut and washer assemblies, generally designated by the number 64.

Thus, in the form of the invention depicted in FIG. 7, the annular venturis are disposed both above and below the plate 60, thereby permitting deagglomeration of particulate clusters to occur in laminar fluid flow at levels both above and below the plate 60. The mechanism of accomplishing such deagglomeration contemplates the introduction of easily or previously wetted powder to a fluid flow created by the rotation of this form of the invention in a suitable container, the exertion of centrifugal force by said fluid flow and plate 60 so as to urge said powder generally radially of the plate 60, the transmission of said powder in the directions indicated by the arrows "J," "K," "L" and "M," so as to introduce agglomerates of the powder to fluid flow through the annular venturis between the plate 60 and rings 61, 62, thereby exposing them to viscous shear stress which induces deagglomeration in the manner indicated in the description of the first-described form of the invention.

In respect to each of the above-described forms of the invention, it is to be understood that the currents in the directions indicated by the arrows, "C," "D," "K," "M," are contributed to by flow induced by a pressure drop across the annular venturis. For example, it will be noted that fluid in the inverted, generally cup-shaped region 17 undergoes an angular velocity induced by the rotation of the venturis. Accordingly, the fluid is urged centrifugally through the venturis, as previously noted, to the regions external thereto and thence downward so that it may re-enter the mouth of the inverted, generally cup-shaped region 17 and again be subjected to said centrifugal action, thereby maintaining a continuous flow and pressure drop from the internal to the external circumferential peripheries of the annular venturis. A similar action occurs in the other described forms of the invention.

Thus, in each form of the invention, the particulate matter involved is subjected to a wetting and deagglomeration by the currents involved.

It is also to be understood that the particulate matter may consist of pigment powder, such as encountered in the paint industry, and may also consist of a variety of other powders or particulate matter intended for dispersion in a liquid medium. In addition, the invention is also capable of blending or dispersing droplets of liquids which tend to cohere despite their reception and mutual solubility in other liquids. Such coherent droplets are subject to homogenization or dispersion of one liquid phase in the other by the annular venturis in the same manner as that described in reference to the above mentioned particulate clusters or agglomerates.

I claim:

1. In a rotable impeller for dispersing wetted particulate matter in a liquid medium contained in a vessel, the combination comprising:

(a) a spindle:

(b) a carrier plate disposed in said liquid medium and depending from said spindle;

(c) annular venturi means depending from said carrier plate;

(d) said wetted particulate matter including particulate agglometrates;

(e) a portion of the liquid medium communicating with a central region defined by the inner periphery of said annular venturi means, whereby said portion of the liquid medium is subjected to a centrifugal force upon rotation of the annular venturi means, thereby inducing laminar fluid flow therethrough and circulation of the liquid medium to said central region from the region adjacent to the external periphery of the annular venturi means;

(f) adjacent portions of fluid in said laminar fluid flow being transmitted through said annular venturi means at different fluid velocities;

(g) the particulate agglomerates being receivable within currents in the liquid medium communicating with said central region and transmissible through the annular venturi means by said laminar fluid flow therethrough, thereby exposing the particulate agglomerates to said different fluid velocities of said adjacent portions of fluid, whereby said particulate agglomerates are subjected to viscous shear stress within said fluid flow, which urges them to deagglomerate;

(h) said carrier plate being surmounted by a plurality of annularly spaced vane means;

(i) said annular venturi means including:

(i) at least one annular ring provided with a portion adjacent to said plate;

(ii) said adjacent portion including marginal perimeters of the external and internal circumferential peripheries of said annular ring;

(iii) said marginal perimeter of the external circumferential periphery of said annular ring being parallel to said plate;

(iv) said marginal perimeter of the internal circumferential periphery of said annular ring being inclined with respect to said plate and extending divergently thereof from said marginal perimeter of the external circumferential periphery of said annular ring to its inner circumferential periphery;

(v) intermittent means for spacing said annular ring from said plate.

2. In a rotatable impeller for dispersing wetted particulate matter in a liquid medium contained in a vessel, the combination comprising:

(a) a spindle;

(b) a carrier plate disposed in said liquid medium and depending from said spindle;

(c) annular venturi means depending from said carrier plate;

(d) said wetted particulate matter including particulate agglomerates;

(e) a portion of the liquid medium communicating with a central region defined by the inner periphery of said annular venturi means, whereby said portion of the liquid medium is subjected to a centrifugal force upon rotation of the annular venturi means, thereby inducing laminar flow therethrough and circulation of the liquid medium to said central region from the region adjacent to the external periphery of the annular venturi means;

(f) adjacent portions of fluid in said laminar fluid flow being transmitted through said annular venturi means at different fluid velocities;

(g) the particulate agglomerates being receivable within currents in the liquid medium communicating with said central region and transmissible through the annular venturi means by said laminar fluid flow therethrough, thereby exposing the particulate agglomerates to said different fluid velocities of said adjacent portions of fluid, whereby said particulate agglomerates are subjected to viscous shear stress within said fluid flow, which urges them to deagglomerate;

(h) said carrier plate being surmounted by a plurality of annularly spaced vane means;

(i) said annular venturi means including:

(i) at least one annular ring provided with a portion adjacent to said plate;

(ii) said adjacent portion including marginal perimeters of the external and internal circumferential peripheries of said annular ring;

(iii) said marginal perimeter of the external circumferential periphery of said annular ring being inclined with respect to said plate and extending divergently thereof towards the outer circumferential periphery of said annular ring;
(iv) said marginal perimeter of the internal circumferential periphery of said annular ring being inclined with respect to said plate and extending divergently thereof from said marginal perimeter of the external circumferential periphery of said annular ring to its inner circumferential periphery;
(v) intermittent means for spacing said annular ring from said plate.

3. In a rotatable impeller for dispersing wetted particulate matter in a liquid medium contained in a vessel, the combination comprising:
(a) a spindle;
(b) a carrier plate disposed in said liquid medium and depending from said spindle;
(c) annular venturi means depending from said carrier plate;
(d) said wetted particulate matter including particulate agglomerates;
(e) a portion of the liquid medium communicating with a central region defined by the inner periphery of said annular venturi means, whereby said portion of the liquid medium is subjected to a centrifugal force upon rotation of the annular venturi means, thereby inducing laminar fluid flow therethrough and circulation of the liquid medium to said central region from the region adjacent to the external periphery of the annular venturi means;
(f) adjacent portions of fluid in said laminar fluid flow being transmitted through said annular venturi means at different fluid velocities;
(g) the particulate agglomerates being receivable within currents in the liquid medium communicating with said central region and transmissable through the annular venturi means by said laminar fluid flow therethrough, thereby exposing the particulate agglomerates to said different fluid velocities of said adjacent portions of fluid, whereby said particulate agglomerates are subjected to viscous shear stress within said fluid flow, which urges them to deagglomerate;
(h) said carrier plate being surmounted by a plurality of annularly spaced vane means;
(i) said annular venturi means including:
(i) at least one annular ring provided with a portion adjacent to said plate;
(ii) said adjacent portion including marginal perimeters of the external and internal circumferential peripheries of said annular ring;
(iii) said marginal perimeter of the external circumferential periphery of said annular ring being parallel to said plate;
(iv) said marginal perimeter of the internal circumferential periphery of said annular ring being inclined with respect to said plate and extending divergently thereof from said marginal perimeter of the external circumferential periphery of said annular ring to its inner circumferential periphery;
(v) intermittent means for spacing said annular ring from said plate;
(j) said intermittent means for spacing said annular ring from said plate including a plurality of washers seated at angular intervals between said plate and said annular ring;
(k) said washers accommodating longitudinal fastening means extending from the plate to the annular ring.

4. In a rotatable impeller for dispersing wetted particulate matter in a liquid medium contained in a vessel, the combination comprising:

(a) a spindle;
(b) a carrier plate disposed in said liquid medium and depending from said spindle;
(c) annular venturi means depending from said carrier plate;
(d) said wetted particulate matter including particulate agglomerates;
(e) a portion of the liquid medium communicating with a central region defined by the inner periphery of said annular venturi means, whereby said portion of the liquid medium is subjected to a centrifugal force upon rotation of the annular venturi means, thereby inducing laminar fluid flow therethrough and circulation of the liquid medium to said central region from the region adjacent to the external periphery of the annular venturi means;
(f) adjacent portions of fluid in said laminar fluid flow being transmitted through said annular venturi means at different fluid velocities;
(g) the particulate agglomerates being receivable within currents in the liquid medium communicating with said central region and transmissible through the annular venturi means by said laminar fluid flow therethrough, thereby exposing the particulate agglomerates to said different fluid velocities of said adjacent portions of fluid, whereby said particulate agglomerates are subjected to viscous shear stress within said fluid flow, which urges them to deagglomerate;
(h) said carrier plate being surmounted by a plurality of annularly spaced vane means;
(i) said annular venturi means including:
(i) a column of annular rings adjacent to said plate;
(ii) each of said annular rings including an upper and lower portion;
(iii) said upper portion including marginal perimeters of the external and internal circumferential peripheries of said each annular ring;
(iv) said marginal perimeter of the external circumferential periphery of said each annular ring and said lower portion thereof being parallel to said plate;
(v) said marginal perimeter of the internal circumferential periphery of said each annular ring being inclined with respect to said plate and extending divergently thereof from said marginal perimeter of the external circumferential periphery of said each annular ring to its inner circumferential periphery;
(vi) intermittent means for spacing said column of annular rings with respect to said plate and for spacing each of said annular rings with respect to each other.

5. In a rotatable impeller for dispersing wetted particulate matter in a liquid medium contained in a vessel, the combination comprising:
(a) a spindle;
(b) a carrier plate disposed in said liquid medium and depending from said spindle;
(c) annular venturi means depending from said carrier plate;
(d) said wetted particulate matter including particulate agglomerates;
(e) a portion of the liquid medium communicating with a central region defined by the inner periphery of said annular venturi means, whereby said portion of the liquid medium is subjected to a centrifugal force upon rotation of the annular venturi means, thereby inducing laminar fluid flow therethrough and circulation of the liquid medium to said central region from the region adjacent to the external periphery of the annular venturi means;

(f) adjacent portions of fluid in said laminar fluid flow being transmitted through said annular venturi means at different fluid velocities;
(g) the particulate agglomerates being receivable within currents in the liquid medium communicating with said central region and transmissible through the annular venturi means by said laminar fluid flow therethrough, thereby exposing the particulate agglomerates to said different fluid velocities of said adjacent portions of fluid, whereby said particulate agglomerates are subjected to viscous shear stress within said fluid flow, which urges them to deagglomerate;
(h) said carrier plate being surmounted by a plurality of annularly spaced vane means;
(i) said annular venturi means including:
 (i) a column of annular rings adjacent to said plate;
 (ii) each of said annular rings including an upper and lower portion;
 (iii) said upper portion including marginal perimeters of the external and internal circumferential peripheries of said each annular ring;
 (iv) said lower portion being parallel to said plate;
 (v) said marginal perimeter of the external circumferential periphery of said each annular ring being inclined with respect to said plate and extending divergently thereof towards the outer circumferential periphery of said each annular ring;
 (vi) said marginal perimeter of the internal circumferential periphery of said each annular ring being inclined with respect to said plate and extending divergently thereof from said marginal perimeter of the external circumferential periphery of said each annular ring to its inner circumferential periphery;
 (vii) intermittent means for spacing said column of annular rings with respect to said plate and for spacing each of said annular rings with respect to each other.

6. In a rotatable impeller for dispersing wetted particulate matter in a liquid medium contained in a vessel, the combination comprising:
(a) a spindle;
(b) a carrier plate disposed in said liquid medium and depending from said spindle;
(c) annular venturi means depending from said carrier plate;
(d) said wetted particulate matter including particulate agglomerates;
(e) a portion of the liquid medium communicating with a central region defined by the inner periphery of said annular venturi means, whereby said portion of the liquid medium is subjected to a centrifugal force upon rotation of the annular venturi means, thereby inducing laminar fluid flow therethrough and circulation of the liquid medium to said central region from the region adjacent to the external periphery of the annular venturi means;
(f) adjacent portions of fluid in said laminar fluid flow being transmitted through said annular venturi means at different fluid velocities;
(g) the particulate agglomerates being receivable within currents in the liquid medium communicating with said central region and transmissible through the annular venturi means by said laminar fluid flow therethrough, thereby exposing the particulate agglomerates to said different fluid velocities of said adjacent portions of fluid, whereby said particulate agglomerates are subjected to viscous shear stress within said fluid flow, which urges them to deagglomerate;
(h) said annular venturi means including:
 (i) a column of annular rings;
 (ii) said plate being disposed intermediately of said annular rings;
 (iii) each of said annular rings including a portion facing towards said plate and a portion opposite to said facing portion;
 (iv) said facing portion including marginal perimeters of the external and internal circumferential peripheries of said each annular ring;
 (v) said marginal perimeter of the external circumferential periphery of said each annular ring and said opposite portion being parallel to said plate;
 (vi) said marginal perimeter of the internal circumferential periphery of said each annular ring being inclined with respect to the plate and extending divergently thereof from said marginal perimeter of the external circumferential periphery of said each annular ring to its inner circumferential periphery;
 (vii) intermittent means for spacing of said annular rings with respect to said plate and for spacing each of said annular rings with respect to each other.

7. In a rotatable impeller for dispersing particulate matter into a liquid medium contained in a vessel, the combination comprising:
(a) a spindle;
(b) means depending from said spindle and extending radially thereof;
(c) annular venturi means disposed in said liquid medium and depending from said radially extending means;
(d) said annular venturi means including at least one annular ring adjacent to said radially extending means and defining therewith a radially outward convergent region and a radially outward divergent region of flow whereby laminar fluid flow is induced therethrough upon rotation of the impeller;
(e) said particulate matter being receivable in said liquid medium and including particulate agglomerates;
(f) said particulate agglomerates being communicable to the region within said annular ring after said particulate agglomerates are received within said liquid medium;
(g) said particulate agglomerates being transmissible through said laminar fluid flow after their communication with said region within said annular ring, thereby subjecting the particulate agglomerates to viscous shear stress within said laminar fluid flow, whereby said particulate agglomerates are urged to deagglomerate.

8. The process for dispersing masses of coherent particulate matter in a liquid medium contained in a vessel thereof, comprising the steps of:
(a) disposing an impeller in said liquid medium in the vicinity of the central axis of said vessel and rotating said impeller to form a cup-shaped opening in said liquid medium, the rotation of the impeller also forming regions of turbulent flow in the liquid medium around the impeller;
(b) introducing said masses of coherent particulate matter into said sup-shaped opening and into the vicinity of the upper portion of said impeller, whereby said masses of coherent particulate matter are subjected to centrifugal force and urged into said regions of turbulent flow, thereby breaking up said masses of coherent particulate matter into smaller particulate agglomerates and exposing said smaller particulate agglomerates to a wetting action by said liquid medium;
(c) disposing said impeller substantially laterally of the vicinity of the central axis of said vessel, whereby said sup-shaped opening is eliminated;

(d) said smaller particulate agglomerates being communicable with annular venturi means included in said impeller when said impeller is disposed substantially laterally of the vicinity of the central axis of said vessel, whereby said smaller particulate agglomerates are subjected to viscous sheer stress encountered in laminar fluid flow through said annular venturis, thereby urging said smaller particulate agglomerates to deagglomerate.

References Cited

UNITED STATES PATENTS

| | | | |
|---|---|---|---|
| 3,071,353 | 1/1963 | Klein | 259—134 |
| 3,273,865 | 9/1966 | White | 259—108 |
| 3,290,016 | 12/1966 | Lennon | 259—108 |
| 3,376,024 | 4/1968 | Beechler | 259—134 |

ROBERT W. JENKINS, Primary Examiner

U.S. Cl. X.R.

259—96